May 28, 1935.　　G. T. HART, JR., ET AL　　2,002,574
AREA MEASURING MACHINE
Filed Dec. 14, 1933　　3 Sheets-Sheet 2

INVENTORS
George T. Hart Jr.
Erastus E. Winsley
By their Attorney,
Harlow M. Davis Patented May 28, 1935

2,002,574

UNITED STATES PATENT OFFICE 2,002,574

AREA MEASURING MACHINE

George T. Hart, Jr., and Erastus E. Winkley, Lynn, Mass., assignors to United Shoe Machinery Corporation, Paterson, N. J., a corporation of New Jersey Application December 14, 1933, Serial No. 702,372

16 Claims. (Cl. 33—121)

This invention relates to measuring machines and more particularly to machines for measuring the area of irregularly shaped pieces of work such as hides and skins. It is to be understood, however, that the invention and various important features thereof may have other applications and uses.

It has heretofore been proposed to measure the area of pieces of leather by means of an apparatus comprising a photo-electric cell in an electrical circuit, since the cell is sensitive to variations in the intensity of light reaching it caused, for example, by interposing pieces of work of different sizes between a source of light and the said cell. In circuit with the photo-electric cell is a galvanometer which indicates variations of the current in the circuit due to variations in the intensity of the light passing through the window of said cell. To facilitate measuring operations, the galvanometer is calibrated to measure in feet and fractions thereof.

It is an object of the invention to improve apparatus of this type in such manner as to increase the productive capacity of the apparatus, and also the efficiency of the operator by reducing in a marked degree the labor and attention required of him.

To these ends and in accordance with an important feature of the invention there is provided, in an organization wherein a galvanometer or milliammeter serves as a measurement indicator under control of a photo-electric cell, means for feeding pieces of work successively into position for a measuring operation together with means controlled by each piece of work for holding the indicator in indicating position at the instant that measurement of a piece of work is completed. In this way the operator is freed from the necessity of watching the position of the work since the time of operation of said holding means is determined by the position of the work. Hence the operator may be engaged in preparing to introduce a new piece of work while the rear portion of the preceding piece of work is moving into the apparatus under control of said feeding means. In the illustrated construction, the indicator holding means is controlled by a device rendered operative by the passage of the rear end of the work to initiate operation of the holding means. In this way also the operator is freed from the necessity of being on the alert to observe the indicator at the instant it indicates the complete measurement of the work since, in the illustrated construction, the indicator pointer is practically locked in its indicating position, thus making it possible for the operator to read the indication accurately at any time before introducing a fresh piece of work. Preferably and as shown, the construction of the holding means is such that the indicator is released for a subsequent indicating operation upon introducing a fresh piece of work, the device which became operative upon passage of the rear end of the prior work piece to initiate operation of the indicator holding means now conveniently serving to initiate release of the indicator.

In the illustrated embodiments of the invention, means is provided for breaking the circuit of the photo-electric cell in the intervals between measuring operations, the breaking of said circuit taking place only after movement of the indicator holding means to operative position. In order to secure this sequence of operations there is conveniently provided a circuit breaker at the exit opening of a chamber wherein measurements are made, the circuit breaker being also controlled by the work as the latter starts to leave the said chamber. As shown, the circuit breaker comprises a member adapted to be lifted by the forward end of a moving work piece after operation of said indicator holding means has been initiated by the device which is controlled by the passage of the rear end of the same moving work piece. The purpose of the circuit breaker operating in timed relation to the said indicator holding means is to minimize possible fatigue of the photo-electric cell which, if it occurs, would cause inaccurate readings to be registered by the indicator.

These and other important features of the invention, together with novel combinations of parts, will now be described in detail in the specification and then pointed out more particularly in the appended claims.

Figure 1:
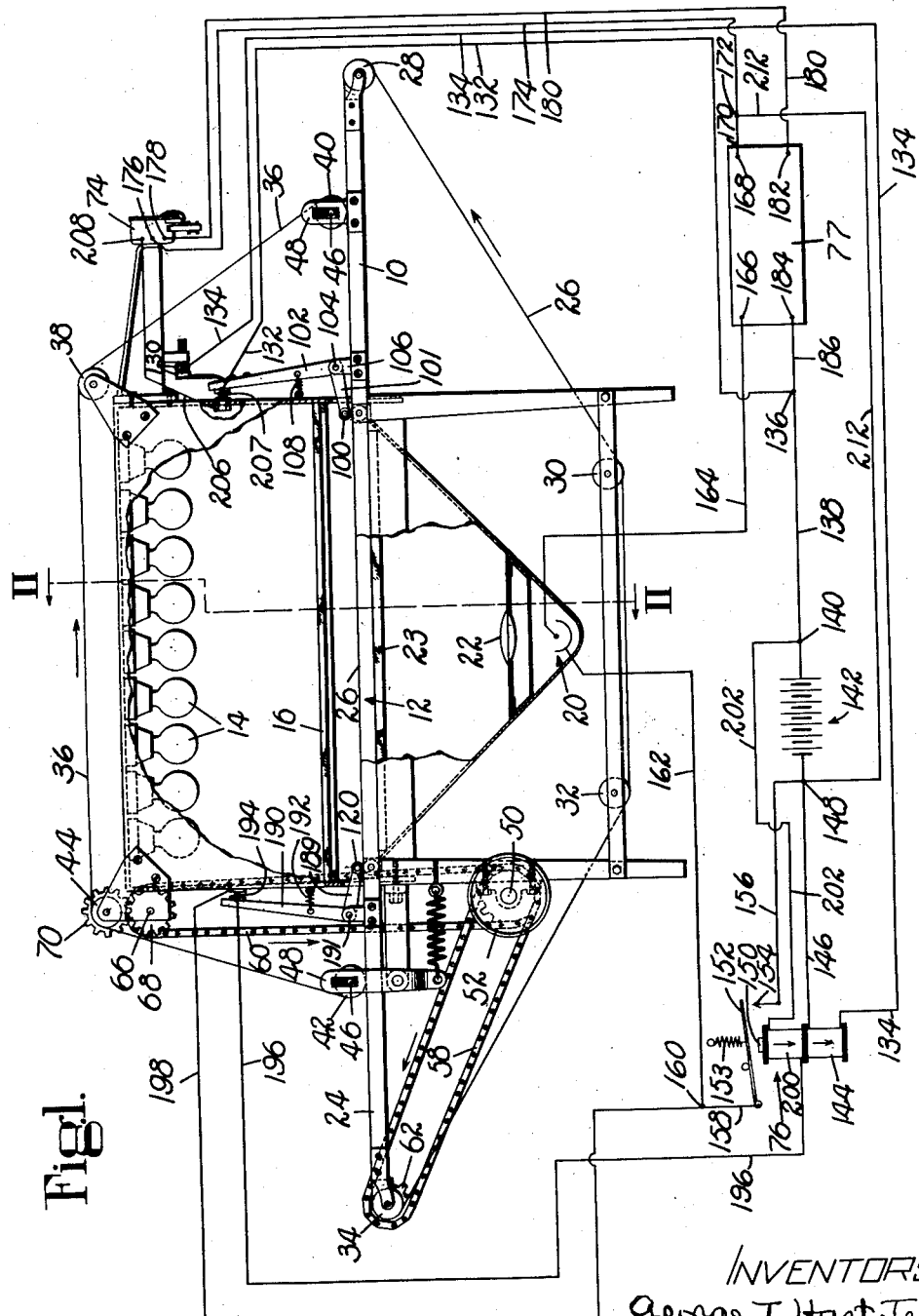
Fig. 1 is a view in side elevation and partly in section of an apparatus illustrating one embodiment of the invention, the electric circuits being diagrammatically shown.

In the illustrated machine which is designed specially for the measurement of the superficial area of pieces of work of irregular contour such as hides and skins, there is provided a table 10 at the entrance end of a chamber 12 where measurements of pieces of work take place. Within the chamber 12 there is provided in the illustrated construction a bank of incandescent lamps 14, it being understood, however, that any other suitable source of light may be provided such, for instance, as one or more Cooper-Hewitt lamps. The light from the lamps 14 passes through a translucent sheet of material indicated at 16, the purpose of the translucent material being to secure uniformity in the intensity of the light which will finally reach a photo-electric cell, illustrated diagrammatically at 20, through a converging convex lens 22. The light from lamps 14 also passes through a transparent sheet of glass 23 which is there for the purpose of protecting the lens 22 from dust and bits of fibre from the skins which, if lodged on the lens, would seriously impair the accuracy of the reading on the indicator. Means is conveniently provided for moving pieces of work from the table 10 through the chamber 12 by continuous movement toward a delivery table 24.

The means for feeding the work mentioned in the preceding paragraph comprises, in the illustrated construction, endless wires 26 which travel over the tables 10 and 24 and over rolls 28, 30, 32, and 34, of which the roll 34 is power driven while the other rolls 28, 30, 32 are idlers. It will be observed, upon inspection of Fig. 2, that the wires 26 are spaced relatively closely to each other to afford adequate support for the pieces of work, particularly while they are passing through the chamber 12 wherein the wires 26 are shown in spaced relation to and above the lower transparent plate 23. For holding each piece of work in extended condition upon the supporting wires 26 and for insuring that the work will travel at a uniform rate along with the supporting wires 26, there is provided a plurality of wires 36 supported by and traveling around rolls 38, 40, 42 and 44, the last-named roll 44 being conveniently power driven while the others are idlers. As shown, the rolls 40 and 42 are supported in journal boxes 46 which are vertically slidable in slots provided in supporting brackets 48, the purpose being to keep the wires 36 properly tensioned while at the same time permitting adjustment of the wires and of the rolls 40, 42 to variations in the thickness of each piece of work and also to variations in different pieces of work. Power means is conveniently provided for driving the sets of wires 26 and 36 simultaneously at the same rate, the said means comprising in the illustrated construction a shaft 50 mounted in the frame of the machine and provided at one end with a pulley 52 (Fig. 2) arranged to be driven from any suitable source of power. At its other end the shaft 50 carries two sprocket wheels 54, 56, respectively, about which pass sprocket chains 58 and 60, respectively. As shown, the chain 58 passes also over a sprocket wheel 62 (Figs. 1 and 2) secured to the shaft of the roll 34 while chain 60 passes also over sprocket wheel 64 carried by a shaft 66 journaled in the frame of the machine near the top thereof, the said shaft 66 carrying also a gear 68 (Fig. 2) arranged to be in mesh with a gear 70 carried by the shaft of the roll 44. Upon inspection of Figs. 1 and 2, it will be readily seen that by the means described the sets of wires 26 and 36 are driven simultaneously at the same speed and with the adjacent portions of these wires traveling in the same direction to guide and feed the work from the entrance table 10 through the chamber 12 and to the delivery table 24.

Figure 2:
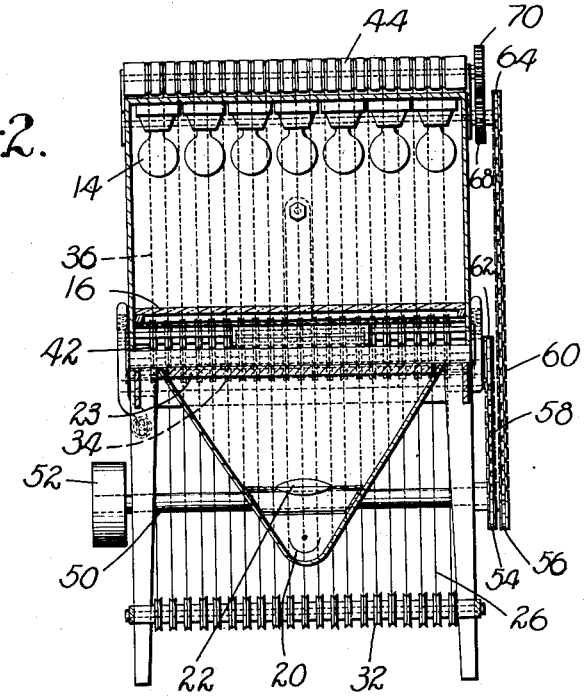
Fig. 2 is a view taken along the line II—II in Fig. 1 looking in the direction of the arrows.

In the illustrated construction there is provided an indicator in the form of a milliammeter 74 (Figs. 1, 3 and 4) controlled by the photo-electric cell 20 (Figs. 1 and 2), means being provided for making and breaking the circuit of said cell comprising a relay illustrated diagrammatically at 76 (Fig. 1). It will be understood that the indicator is calibrated to measure in units of area.

While under certain conditions it might not be necessary to employ an amplifier in the line connecting the photo-electric cell 20 and the milliammeter 74, it is altogether likely that under modern industrial conditions an amplifier will be found advantageous. Hence it is employed in the construction shown. This means that the circuit of the photo-electric cell and that of the milliammeter are associated in an amplifier 77 (Fig. 1) and that variations in the circuit through the photo-electric cell are passed through the amplifier and amplified to produce variations in the milliammeter circuit which are of suitable value to give readings on the milliammeter scale. However, since the construction of the present-day amplifier is well known (and does not constitute a part of the invention herein disclosed and claimed), it will not be described in this specification. Hence, in the further description of the invention and in the claims, the photo-electric cell circuit and that of the milliammeter will be referred to as one circuit.

While a piece of work is passing into the chamber 12, and for a brief period while it is completely in the chamber, the circuit through the photo-electric cell 20, the milliammeter 74 and the relay 76 is closed, and pointer 78 (Fig. 3) of the milliammeter 74 is free to indicate variations in the current in the milliameter circuit caused by the effect of variations in the intensity of the light reaching the photo-electric cell 20. When the piece of work has fully entered the chamber 12 so that the whole piece of work is interposed between the bank of lamps 14 and the photo-electric cell 20, there is a clear cut image of the piece of work projected on the photo-electrically sensitive surface of the cell 20 by the lens system at 22. Hence the pointer 78 of the milliammeter indicates by its position the maximum of the effect caused by the particular piece of work in the chamber 12. It is desirable to hold the pointer in its indicating position the instant that the piece of work is fully within the chamber 12 so as to relieve the operator of the necessity of being on the alert to observe the reading of the indicator at the instant the work is completely within the chamber 12.

For locking the pointer 78, that is, for maintaining it in indicating position, there is conveniently provided a member 80 (Figs. 3 and 4) pivotally supported on a shaft 82 in a bracket 84, the said member 80 comprising arms spaced with respect to each other and carrying at their upper ends a cord 86 adapted to contact with the pointer 78 to hold the latter (by pressure thereon) in its indicating position. In the construction shown, locking member 80 is held by a spring 88 in its inoperative or releasing position with respect to the pointer 78, movement of the locking member 80 to locking position being effected in the illustrated construction through an electro-magnet 90 in a circuit which will be hereinafter described.

Means is provided in the illustrated construction for initiating the operation of locking the pointer in its indicating position, the said means being conveniently controlled by the work so that locking of the pointer takes place automatically as soon as the piece of work has reached a position in the chamber 12 where its whole surface is interposed in the path of the light from the lamps 14 to the photo-electric cell 20. As illustrated in Fig. 1, the said means is a device which comprises a roll 100 (Fig. 1) supported by two arms, of which one is shown at 101, fastened to a shaft 104, said shaft being rotatably mounted in brackets 106 carried by the table 10. A lever 102 is fixedly mounted on the shaft 104 and yieldingly held in the position shown in Fig. 1 by a spring 108. In the position of the lever 102 shown in Fig. 1, the circuit through the electro-magnet 90 is closed whereby said magnet operates to move the locking member 80, 86 (Figs. 3 and 4) to operative position with respect to the pointer 78 against the tension of the spring 88. A fresh piece of work entering under the roll 100 lifts the latter and breaks the circuit of the electro-magnet 90 with the result that the spring 88 moves the locking member 80, 86 to inoperative position whereupon the pointer 78 is free to move in any direction, to indicate measurement of the work. However, as soon as the rear end of the moving piece of work passes from under the roll 100, the latter drops to the position shown in Fig. 1, thereby closing the circuit through the electro-magnet 90 and in this way initiating locking of the indicator pointer 78 in its indicating position.

It is to be understood from the foregoing description that the indicator pointer 78 is locked in indicating position by the locking means 80, 86 while the circuit of the milliammeter 74 and the photo-electric cell 20 is closed, since only in this way is it possible to lock the pointer while it is indicating the complete measurement of a piece of work. Ordinarily it is desirable to break the circuit of the photo-electric cell at the end of measuring operations upon each piece of work. Accordingly, a circuit breaker is provided for this purpose, the circuit breaker being preferably separate from the roll member 100 so that the latter may be used as a means for closing the photocell circuit upon entering a piece of work into the chamber 12. In the illustrated construction, the circuit breaker comprises a roll member 120 spaced from the roll member 100 the full length of the chamber 12, the distance between said roll members 100, 120 being somewhat greater than the overall dimension of the largest piece of work which the machine is adapted to measure while it is being fed in the direction of movement of the described feeding means. Hence, the roll member 120 is lifted by the forward end of the piece of work only after the roll member 100 has dropped off the rear end of that piece of work. This insures that the circuit containing the photo-electric cell 20 and the milliammeter 74 is broken only after the pointer 78 is locked in indicating position.

As stated above, the circuit of the photo-electric cell 20 and of the milliammeter 74 includes also the relay 76. This circuit is closed when the roll member 100 is lifted by the entering end of the work. Upon inspection of Fig. 1 it will be observed that as the roll member 100 is lifted the lever 102 is rocked to the right, thus closing contacts at 130, the result being that a circuit comprising wires 132, 134 is closed. The wire 132 leads to a junction 136 from which a wire 138 leads to terminal 140 of a battery 142. The other wire 134, leading from the contact 130, runs directly to a solenoid 144 and thence by a wire 146 to terminal 148 of the battery 142. Hence upon closing the contacts at 130 a current flows through the described circuit and a magnet 150 within the solenoid 144 is energized to draw a switch member 152 against resistance of a spring 153 into contact with a terminal 154. Closing of the contact between the switch member 152 and the terminal 154 closes the circuit which includes the photo-electric cell 20 and the milliammeter 74, as will now be described. Starting with the terminal 148 of the battery 142, a wire 156 leads to the terminal 154, the current now passing through the switch member 152 in contact with said terminal 154 and through a wire 158 to a junction 160 and thence by a wire 162 to the photo-electric cell 20. From the cell 20 another wire 164 leads to a binding post 166 of the amplifier 77, the circuit continuing to a post 168 of the amplifier and thence by a wire 170 to a junction 172. From junction 172 a wire 174 leads to a binding post 176 on the milliammeter 74. Returning from the milliammeter 74 at binding post 178 is a wire 180 which leads to binding post 182 of the amplifier 77. The current passes thence to a binding post 184 from which a wire 186 leads to the junction 136 and by the wire 138 to terminal 140 of the battery 142, thus completing the circuit.

Upon reference to Fig. 1 of the drawings it will be understood that roll member 120 is carried by a pair of like arms of which one is shown at 189 mounted fixedly on a shaft 191. Fastened to shaft 191 is a lever 190 normally held in the position shown in Fig. 1 by a spring 192. Upon lifting the roll 120 the upper end of the lever 190 is moved to the left in Fig. 1, separating contact points 194 and opening a circuit comprising wires 196, 198, and a solenoid 200. The solenoid 200, at one end of wire 196, is connected by a wire 202 to the terminal 140 of the battery 142. The wire 198, associated with wire 196 at the contact point 194, is connected to the junction 160, the current (when the circuit is closed) passing by the wire 158 through the closed switch member 152 and the wire 156 to the other terminal 148 of the battery 142. If now the roll 120 be lifted by the forward end of the moving piece of work, the contact at 194 is broken, thus breaking the circuit comprising solenoid 200. Since roll 100 dropped off the rear end of the moving piece of work before roll 120 was lifted by the front end of the same moving piece of work, the solenoid 144 was already de-energized when solenoid 200 became de-energized by the breaking of contact 194 and hence the switch member 152 was moved to open position by spring 153. Opening of switch member 152 breaks the circuit of the photo-electric cell 20 and of the milliammeter 74. It is to be particularly noted that dropping of roll 100 from the rear end of a moving piece of work, while it effected de-energizing of the solenoid 144, did not result in breaking the circuit of the cell 20 and of the milliammeter 74 since the switch 152 was held in place by the still active solenoid 200. Hence the roll 120 becomes a circuit breaker when it is lifted after the roll 100 has dropped from the rear end of the moving work. Lifting of the roll 100 by the entering end of a fresh piece of work results in energizing solenoid 144, whereby the switch member 152 is moved down into contact with terminal 154 to complete the circuit through the cell 20 and the milliammeter 74.

As stated earlier in the specification, dropping of the roll member 100 from off the rear end of the work, as the latter passes into the chamber 12, results in locking of the pointer 78, this being accomplished through closing the circuit of the electro-magnet 90. As shown in Fig. 1, this circuit comprises wires 132 and 206 arranged to be connected to each other through contact points at 207. Wire 206 leads to a terminal 208 on the casing of the milliammeter 74, the terminal 208 being connected to the electro-magnet 90 from which a wire extends to the terminal 176 from which the wire 174 extends to the junction point 172. From the point 172 a wire 212 extends to the terminal 148 at the far side of the battery 142. As already described, the wire 132 is connected to the terminal 140 at the near side of the battery 142.

Figure 4:
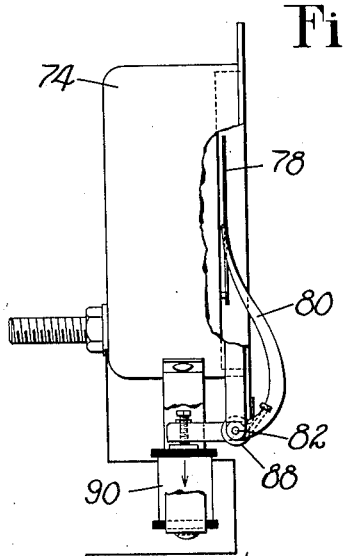
Fig. 4 is a side view of Fig. 3, parts being broken away more clearly to show operation of the device.
Figure 5:
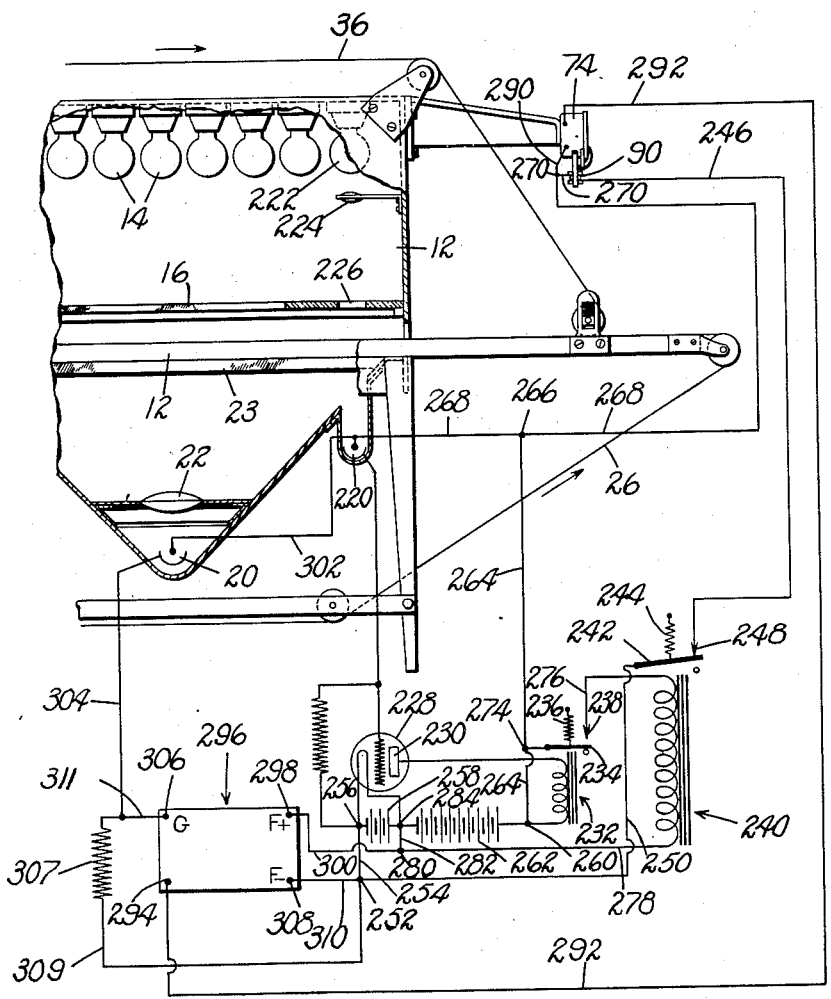
Fig. 5 is a view similar to Fig. 1, showing a modification.

While, as described in the foregoing paragraphs, mechanical means controlled by the work is provided for initiating operation of the locking means for the pointer 78 of the milliammeter 74, it is to be understood that other means may be substituted therefor such as means under electrical control. More specifically, a photo-electric cell with suitable connections may be utilized as a device to control the locking means, the photo-electric cell being responsive to the presence or absence of a piece of work interposed between the cell and a source of light. In the construction illustrated in Fig. 5 of the drawings, there is provided a photo-electric cell 220 upon which light is focused from a lamp 222 by means of a double convex lens 224, an opening 226 being provided in the translucent plate 16 for the passage of light from the lamp 222 to the photo-cell 220. Under these conditions a current passes from the photo-electric cell 220 to an amplifier tube 228 with the result that a current passes from a plate 230 in the amplifier 228 through a circuit which comprises a relatively sensitive relay 232, by which a switch member 234 is pulled downwardly against the resistance of a spring 236 away from a contact 238, thus breaking the circuit of a heavy duty relay 240. Under these conditions a switch 242 is moved upwardly away from the magnet of the relay 240 by a spring 244, thus making a circuit which includes the magnet 90 (Figs. 3, 4 and 5) with the result that the locking means 80, 86 (Figs. 3 and 4) is moved to operative position with respect to the pointer 78. Hence, when no work is interposed between the lamp 222 and the photo-electric cell 220 (as indicated in Fig. 5), the pointer 78 of the milliammeter 74 is locked in indicating position. This circuit which includes the magnet 90 begins at the magnet 90 and includes a wire 246 which, through a contact at 248, connects with the switch 242. Connected to the switch 242 is a wire 250 which leads to a junction 252 from which a wire 254 extends to a terminal 256 of an A battery 258. From a terminal 260 of a B battery 262 (which is directly connected to the battery 258) there extends a wire 264 to a junction 266 from which extends another wire 268 to a junction 270, the current passing by another wire 272 to the other terminal of the magnet 90, thus completing the circuit.

Figure 3:
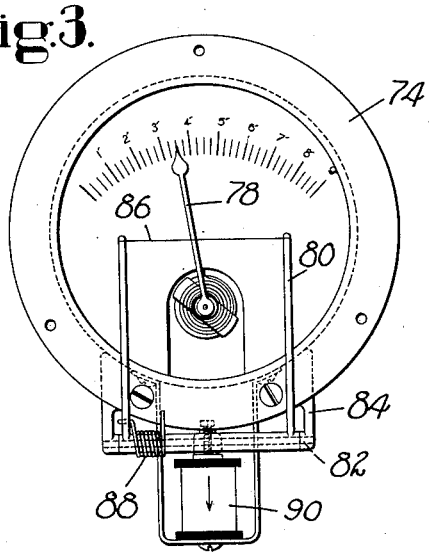
Fig. 3 is a face view of the indicator and of its locking means.

When a piece of work is passed into the chamber 12 sufficiently to be interposed between the lamp 222 and the photo-cell 220, no current is transmitted from the said photo-cell to the grid of the amplifier tube 228. Under these circumstances there is no current passing through the sensitive relay 232. In that case the spring 236 moves the switch 234 upwardly into contact with the contact point 238, thereby establishing a circuit in the heavy duty relay 240 with the result that the switch 242 is moved downwardly against the resistance of the spring 244 breaking the contact at 248, and thus de-energizing the magnet 90 (Figs. 3, 4 and 5). Upon de-energizing the magnet 90 the locking means 80, 86 is moved to inoperative position, thus freeing the pointer 78 of the milliammeter 74 with the result that the pointer is free to respond to variations in the current passing through the photo-electric cell 20, as described in connection with the disclosure of Figs. 1 to 4, inclusive, of the drawings.

It may be pointed out that the circuit of the relay 240 includes the terminal 260 of the B battery 262, the current passing through the wire 264 to a junction 274 and thence to the switch 234 and a wire 276 to the relay 240 and thence back by a wire 278 to a junction 280 from which there leads a wire 282 to a junction 284 at the other end of the B battery 262. From the foregoing it will be clear that a photo-electric cell, such as the cell 220 with its associated circuits, may be utilized to initiate locking and unlocking of the pointer of the milliammeter 74 serving as an indicator to indicate measurements of pieces of work fed into the chamber 12.

In the modification illustrated in Fig. 5 of the drawings, the milliammeter 74 is in a circuit which may be described as follows: Beginning at the terminal 260 of the B battery 262 the current flows through the wire 264 to the junction 266 and thence by wire 268 to the junction 270 and then by a wire 290 to one terminal of the milliammeter 74. Connected to the other terminal of the milliammeter 74 is a wire 292 which leads to the plate 294 of an amplifier tube 296, from which current passes through the amplifier tube to the positive terminal 298 of its filament from which a wire 300 leads to the junction 280 and thence by the wire 282 to the terminal 284 of the B battery 262. The current flowing through the milliammeter circuit just described is variable, depending upon the voltage applied to the grid 306 of the amplifier tube 296.

The circuit of the photo-electric cell 20 may be described by commencing at the terminal 260 of the B battery 262. From the terminal 260 the wire 264 leads to the junction 266 and then by the wire 268 past the photo-electric cell 220 and thence by a wire 302 to the photo-electric cell 20. From the photo-electric cell 20 there leads a wire 304 to one end of the resistance 307. From the other end of the resistance a wire 309 leads to the junction 252 and thence by the wire 254 to the terminal 256 of the A battery 258 which is connected to the terminal 284 of the B battery 262, thus completing the circuit of the photo-electric cell 20.

Variation in the amount of light falling upon the photo-electric cell 20 has the effect of varying the current flowing in the circuit through said cell. This causes a variation in the voltage across the resistance 307 which varying voltage is applied to the input circuit of the amplifier tube 296 and causes a corresponding current variation in output of the amplifier tube 296. This variation is indicated by the pointer of the milliammeter 74. It will thus be seen that variations in the amount of light reaching the photo-electric cell 20, by reason of the presence of pieces of work of various sizes and contours interposed between the source of light and the said photo-electric cell 20, are recorded by the pointer in the milliammeter 74. Furthermore, the locking of this pointer is under control of the second photoelectric cell 220 which is utilized to initiate locking and unlocking of the pointer of the milliammeter, locking of the pointer taking place when light from a lamp 222 passing through the lens 224 is allowed to strike upon the cell 220.

To measure a piece of work, the latter is introduced into the work feeding means, comprising the sets of wires 26 and 36, by shoving it over the table 10, care being taken to see that the skin or other piece of work is spread out in fully extended condition, all folds and wrinkles being effaced as far as possible. As the work enters between the feeding wires the operator has every opportunity to spread out successive portions of the work even during the entrance of the forward part of the work into the chamber 12 since all portions of the work are easily smoothed out upon the table 10 before actually being engaged by the feeding wires 36. While the machine is empty, the rolls 100 and 120 are both down in the positions shown in Fig. 1, and the magnet 90 is energized to lock the milliammeter pointer 78. At this time the solenoid 144 is inactive due to the spaced contact points at 130, the solenoid 200 being also inactive due to the space between switch member 152 and the terminal 154, the photo-electric cell circuit being also inactive because of said space. As the forward end of the work engages the roll member 100 the latter is lifted, thereby separating the contact points at 207 to break the circuit of the electromagnet 90 and thus to release the locking member 80, 86 to the action of the spring 88, the result being that the pointer 78 is released to move freely in any direction. At practically the same instant that the contact points 207 were separated the contact points at 130 were brought into engagement with each other, thereby closing the circuit comprising wires 132, 134 to energize the electromagnet within the solenoid 144 whereby the relay at 76 is closed by movement of the switch member 152 downwardly against the tension of the spring 153, thus closing the circuit of the photo-electric cell 20 and the milliammeter 74. It is clear, therefore, that lifting of the roll member 100 freed the pointer of the milliammeter 74 and at the same time energized the circuit of the photo-electric cell and of the milliammeter 74. Also the solenoid 200 became energized upon movement of the switch member 152 into contact with the terminal 154. Hence the solenoid 200 also holds the switch closed and maintains the cell circuit even after solenoid 144 becomes inactive. As the piece of work moves into the chamber 12 the light falling upon the photo-electric cell 20 is gradually reduced, the result being recorded in the movement of the pointer 78 to the right in Fig. 3. When the piece of work has completely entered the chamber 12 and the roll member 100 is thus caused to drop off the rear end of the moving work, the pointer is instantly locked in the indicating position which it reached when the whole piece of work was interposed between the bank of lamps 14 and the photo-electric cell 20. Since the circuit through the photo-electric cell 20 and milliammeter 74 was not broken (because of the still active solenoid 200) when the member 100 dropped off the rear end of the work, the pointer 78 was locked at the maximum indicating position for the piece of work undergoing measurement. Subsequently the front end of the piece of work, as the latter continues to move toward the left in Fig. 1, encounters the roll member 120 and lifts it from the position shown in Fig. 1, thus separating the contacts at 194 with the result that the relay circuit through solenoid 200 is broken, thus interrupting the circuit of the photo-cell and milliammeter. Entrance of a fresh piece of work below the roll member 100 releases the pointer, energizes the photo-electric cell circuit (through solenoid 144) and starts the operations all over again. Since the operator does not have to watch the indicator, which is automatically locked by means under control of the work, he is free to pick up a fresh piece of work preparatory to entering the same into the apparatus after the preceding piece of work has been properly introduced into the machine. Furthermore, since the indicator is locked in indicating position he does not have to be on the alert to observe the reading at the completion of a measuring operation. As a matter of fact, he can start a fresh piece of work into the machine and read the indicator up to the moment that the entering end of the work lifts the roll member 100. By this arrangement the work may be fed rapidly and practically continuously through the machine, it being necessary only to see that the roll member 100 is permitted to drop off the rear end of each piece of work being measured, this being the preferable method of operating the machine, since in this way the pieces of work are spaced from each other, each piece being measured separately, and the pointer read while stationary. Since the operation of the contacts is instantaneous in energizing and de-energizing the various circuits, the machine may be operated as fast as the pieces of work can be properly spread out and introduced into the machine, the efficiency of the operator being increased in that the labor of introducing the work is reduced and reading of the indicator facilitated through locking of the pointer in indicating position.

Having thus described my invention, what I claim as new and desire to secure by Letters Patent of the United States is:

1. In an apparatus for measuring pieces of work, a photo-electric cell, a source of light spaced with respect to said cell, means arranged to feed a piece of work into position between said source of light and said cell, an indicator calibrated to measure in units of area, arranged in circuit with the photo-electric cell and responsive to variations in said circuit induced by variations in the light reaching said cell, and means controlled by the work to hold the indicator in its position corresponding to the area of the work piece when the piece of work has been measured.

2. In an apparatus for measuring pieces of work, a photo-electric cell, a souce of light spaced with respect to said cell, means arranged to feed a piece of work into position between said source of light and said cell, an indicator calibrated to measure in units of area, arranged in circuit with the photo-electric cell and responsive to variations in said circuit induced by variations in the light reaching said cell, and a device arranged to be controlled by the position of the rear end of the work as it is fed and operative to effect maintenance of the indicator in indicating position.

3. In an apparatus for measuring pieces of work, a photo-electric cell, a source of light spaced with respect to said cell, means arranged to feed a piece of work into position between said source of light and said cell, an indicator arranged in circuit with the photo-electric cell and responsive to variations in said circuit induced by variations in the light reaching said cell, and a device arranged to be controlled by the position of the rear end of the work as it is fed and operative to effect maintenance of the indicator in indicating position, said device later becoming operative to effect release of the indicator when the front end of a succeeding piece of work reaches a certain position relative to said device.

4. In an apparatus for measuring pieces of work, a photo-electric cell, a source of light spaced with respect to said cell, means arranged to feed a piece of work into position between said source of light and said cell, an indicator arranged in circuit with the photo-electric cell and responsive to variations in said circuit induced by variations in the light reaching said cell, locking means for the indicator, and means controlled by the work to initiate operation of the locking means.

5. In an apparatus for measuring pieces of work, a photo-electric cell, a source of light spaced with respect to said cell, means arranged to feed a piece of work into position between said source of light and said cell, an indicator arranged in circuit with the photo-electric cell and responsive to variations in said circuit induced by variations in the light reaching said cell, said indicator comprising a graduated member and an index member, one of said members being movable, locking means for said movable member, and means controlled by the work to initiate operation of the locking means.

6. In an apparatus for measuring pieces of work, a photo-electric cell, a source of light spaced with respect to said cell, means arranged to feed a piece of work into position between said source of light and said cell, an indicator calibrated to measure in units of area, arranged in circuit with the photo-electric cell and responsive to variations in said circuit induced by variations in the light reaching said cell, said indicator comprising a graduated member and an index member, one of said members being movable, locking means for said movable member, and a device arranged to be controlled with reference to the rear end of the work as it is fed and operative to initiate operation of said locking means.

7. In an apparatus for measuring pieces of work, a photo-electric cell, a source of light spaced with respect to said cell, means arranged to feed a piece of work into position between said source of light and said cell, a meter arranged in circuit with the photo-electric cell and comprising a movable indicator member, an electro-magnet, a member for locking said indicator member arranged to be controlled by said magnet, and a device controlled by the work for controlling said magnet.

8. In an apparatus for measuring pieces of work, a photo-electric cell, a source of light spaced with respect to said cell, means arranged to feed a piece of work into position between said source of light and said cell, a meter calibrated to measure in units of area, arranged in circuit with the photo-electric cell and comprising a movable indicator member, an electro-magnet normally demagnetized, a member for locking said indicator member arranged to be controlled by said magnet, and a device arranged to become operative by the passage of the rear end of the work as it is fed to close the circuit of said magnet whereby the latter is caused to operate the locking means for the indicator member.

9. In an apparatus for measuring pieces of work, a photo-electric cell, a source of light spaced with respect to said cell, means arranged to feed a piece of work into position between said source of light and said cell, a meter arranged in circuit with the photo-electric cell and comprising an indicator member, means to lock the indicator member in indicating position upon termination of a measuring operation on the piece of work, means controlled by the work to initiate operation of the locking means, and means also controlled by the work to break said circuit after the locking of the indicator.

10. In an apparatus for measuring pieces of work, a photo-electric cell, a source of light spaced with respect to said cell, means arranged to feed a piece of work into position between said source of light and said cell, a meter calibrated to measure in units of area, arranged in circuit with the photo-electric cell and comprising an indicator member, means to lock the indicator member in indicating position upon termination of the measuring operation on the piece of work, a device controlled by the rear end of the work to initiate operation of the locking means, and a member controlled by the front end of the work to break said circuit after the operation of the locking means.

11. In an apparatus for measuring pieces of work, a photo-electric cell, a source of light spaced with respect to said cell, means arranged to feed a piece of work into position between said source of light and said cell, a meter arranged in circuit with the photo-electric cell and comprising an indicator member, means to lock the indicator member in indicating position upon termination of the measuring operation on the piece of work, a member arranged to drop off the rear end of the work as it is fed to initiate operation of the locking means, and a member arranged to be lifted by the forward end of the work to break said circuit after the operation of the locking means.

12. In an apparatus for measuring pieces of work, a photo-electric cell, a source of light spaced with respect to said cell, means arranged to feed a piece of work into position between said source of light and said cell, a meter comprising an indicator member, a relay in circuit with said meter and said photo-electric cell, a locking means for said indicator member, a member arranged to drop off the rear end of the work as it is fed to initiate operation of the locking means, and a member arranged to be lifted by the forward end of the same moving piece of work to break the circuit of the relay and thus interrupt the circuit of the photo-electric cell and the meter, lifting of the second member being arranged to take place after the dropping of the first member from the rear end of the work whereby breaking of the circuit of the photo-electric cell and meter takes place after the operation of the locking means.

13. In an apparatus for measuring pieces of work, a photo-electric cell, a source of light spaced with respect to said cell, means arranged to feed a piece of work through the space between said source of light and said cell, a meter comprising an indicator member and calibrated to measure in units of area, a relay arranged to be in circuit with the meter and the photo-electric cell during measuring operations, a locking means for the indicator member of the meter, a member arranged to be lifted by the entering end of the work to render the locking means inoperative and to close said circuit, said member dropping off the rear end of the moving work to initiate operation of the locking means, and a member spaced from the first-mentioned member a distance greater than dimensions of the pieces of work in the direction of feed thereof, said second-mentioned member being arranged to be lifted by the forward end of the moving work to break the circuit of the relay and thus to interrupt the circuit of the photo-electric cell and meter after operation of the locking means for the indicator member of the meter.

14. In an apparatus for measuring pieces of work, a photo-electric cell, a source of light spaced with respect to said cell, means arranged to feed a piece of work into position between said source of light and said cell, an indicator calibrated to measure in units of area, arranged in circuit with the photo-electric cell and responsive to variations in said circuit induced by variations in the light reaching said cell, and means, comprising a photo-electric cell controlled by the work, to hold the indicator in its position corresponding to the area of the work piece when the piece of work has been measured.

15. In an apparatus for measuring pieces of work, a photo-electric cell, a source of light spaced with respect to said cell, means arranged to feed a piece of work into position between said source of light and said cell, an indicator arranged in circuit with the photo-electric cell and responsive to variations in said circuit induced by variations in the light reaching said cell, said indicator comprising a graduated member and an index member, one of said members being movable, locking means for said movable member, and a photo-electric cell controlled by the work to initiate operation of the locking means.

16. In an apparatus for measuring pieces of work, a photo-electric cell, a source of light spaced with respect to said cell, means arranged to feed a piece of work into position between said source of light and said cell, a meter arranged in circuit with the photo-electric cell and comprising a movable indicator member, an electro-magnet, a member for locking said indicator member arranged to be controlled by said magnet, and a photo-electric cell controlled by the work and arranged to control said magnet.

GEORGE T. HART, Jr.
ERASTUS E. WINKLEY.